US010809118B1

(12) United States Patent
Von Muenster

(10) Patent No.: US 10,809,118 B1
(45) Date of Patent: Oct. 20, 2020

(54) MATERIAL UNLOADING MEASUREMENT METHOD

(71) Applicant: Scale Tec, Ltd., Anamosa, IA (US)

(72) Inventor: Nicholas Von Muenster, Anamosa, IA (US)

(73) Assignee: Scale Tec, Ltd., Anamosa, IA (US)

( * ) Notice: Subject to any disclaimer, the term of this patent is extended or adjusted under 35 U.S.C. 154(b) by 0 days.

(21) Appl. No.: 16/862,767

(22) Filed: Apr. 30, 2020

Related U.S. Application Data

(62) Division of application No. 16/751,525, filed on Jan. 24, 2020, now Pat. No. 10,677,637.

(60) Provisional application No. 62/829,155, filed on Apr. 4, 2019.

(51) Int. Cl.
| | |
|---|---|
| *G01G 11/00* | (2006.01) |
| *A01D 41/127* | (2006.01) |
| *G01G 19/12* | (2006.01) |
| *G01G 13/02* | (2006.01) |
| *G01G 11/04* | (2006.01) |
| *G01G 19/08* | (2006.01) |

(52) U.S. Cl.
CPC ....... *G01G 11/003* (2013.01); *A01D 41/1272* (2013.01); *G01G 11/04* (2013.01); *G01G 13/02* (2013.01); *G01G 19/086* (2013.01); *G01G 19/12* (2013.01)

(58) Field of Classification Search
CPC ...... G01G 11/003; G01G 11/04; G01G 13/02; G01G 19/086; G01G 19/12; A01D 41/1272
See application file for complete search history.

(56) References Cited

U.S. PATENT DOCUMENTS

| | | | |
|---|---|---|---|
| 6,572,257 | B2 | 6/2003 | Bump et al. |
| 7,211,745 | B1 | 5/2007 | Brown et al. |
| 8,097,820 | B2 | 1/2012 | Klubertanz et al. |
| 9,668,411 | B2 | 6/2017 | Koch et al. |
| 9,983,048 | B1 | 5/2018 | Meier et al. |
| 10,485,177 | B2 | 11/2019 | Bump et al. |
| 10,520,351 | B2 | 12/2019 | Johansen et al. |
| 2011/0220677 | A1 | 9/2011 | Bertolani et al. |
| 2012/0099948 | A1 | 4/2012 | Bump et al. |
| 2014/0196919 | A1 | 7/2014 | Kowalchuk |
| 2014/0208851 | A1 | 7/2014 | Bischoff |
| 2014/0284118 | A1 | 9/2014 | Van Mill et al. |
| 2016/0029559 | A1 | 2/2016 | Inoue et al. |
| 2016/0055688 | A1 | 2/2016 | Miura et al. |
| 2016/0226977 | A1 | 8/2016 | Fujiwara et al. |
| 2016/0339405 | A1 | 11/2016 | Bump |
| 2016/0343231 | A1 | 11/2016 | Bump |
| 2017/0370765 | A1 | 12/2017 | Meier et al. |
| 2018/0106709 | A1 | 4/2018 | Cherney |

*Primary Examiner* — Natalie Huls
(74) *Attorney, Agent, or Firm* — Shuttleworth & Ingersoll, PLC; Jason Sytsma

(57) ABSTRACT

A first sensor combined to a first storage carrier for the material for detecting vibrations associated with offloading the material and a second sensor for measuring the weight of the material expelled from the first storage carrier.

6 Claims, 12 Drawing Sheets

MATERIAL UNLOADING MEASUREMENT METHOD

CROSS-REFERENCE TO RELATED APPLICATIONS

This Application is a division of U.S. patent application Ser. No. 16/751,525 filed Jan. 24, 2020 which application claims the benefit of U.S. Provisional Patent Application No. 62/829,155 filed Apr. 4, 2019 the contents of both are incorporated herein by reference.

TECHNICAL FIELD

This disclosure generally relates to scale indicators and load cells for agricultural equipment, and more specifically, this disclosure relates to a system with automatic measurement control based on vibration signals.

BACKGROUND INFORMATION

The agriculture industry is widely influenced by new technologies and methods adopted by farmers to improve their farming operations. A main staple of technology is that of weights and measures for calibration and comparison in precision agriculture technology.

Grain harvesting operations today involve the use of precision agriculture technology to theorize the volume and quantity of yield harvested by a storage carrier such as a combine harvester and precision yield monitoring technology. Commonly within the scope of a grain harvesting operation, the combine harvester offloads its grain payload into another storage carrier, such as a mobile hopper, a wagon, or grain cart, to facilitate the transfer of grain out of the field and further to another destination on or off the farm.

Today electronic scales are equipped on the storage carriers, such as wagons and grain carts utilized to offload the grain from the combine harvester and transfer it out the field. The advancement of electronic scale equipment over time has evolved to support methods of recording weight automatically from the hoppers of wagons and grain carts, however, these methods can be flawed and may result in a lack of recognition of the movement of grain, known as the load, due to hardware failure, design, and/or insufficient algorithms tied to weight change only to recognize loading and unloading events.

Commonly the weight change algorithm associated with the recognition of the movement of agriculture commodity into or out of a storage carrier, and recording of weight, requires low pass filters with a large threshold of weight to be loaded or unloaded. This method provides a flaw that if the large threshold of weight transfer is not achieved, the recognition of weight change will not be initiated and the event will not be recorded. Additionally, these methods can be affected by the travel of the grain cart over terrain, providing false recognition of weight change and inaccurate record of loading or unloading events, specifically if the large threshold is reduced to a smaller threshold value.

Other methods include recognition of Power Take Off (PTO) shaft speed associated with driving the powertrain on a grain cart for unloading operations, or a combination of weight change and PTO shaft speed recognition. While these methods may be accurate, they involve a high degree of specialized hardware placement associated with the PTO shaft, and the measurement of revolution speed of rotating parts from the drivetrain system of a grain cart. Commonly the hardware placement is problematic and requires maintenance and replacement due to the failure or damage of the hardware. These methods are limited such that they can only be utilized on a hopper body that uses a powered unloading apparatus, such as an auger, conveyor, vacuum system, or other embodiment to transport or move the grain out of the storage carrier. These methods, or combination of methods, do not work within storage carrier systems which use gravity to transport the agriculture commodity out of the storage carriers, such as a semi-trailer or a grain wagon.

What is needed therefore is a method or methods that can address the above identified problems in the state of the art.

SUMMARY

In accordance with one aspect of the present invention, disclosed is a system for measuring the weight of material. The system comprises of a first sensor combined to a first storage carrier for the material for detecting vibrations associated with offloading the material and a second sensor for measuring the weight of the material expelled from the first storage carrier.

In one implementation, the second sensor is a load cell for measuring the weight of the material, which is in communication with a scale controller for recording and storing weight measurements from the load cell. The scale controller can be in communication with the first sensor. The scale controller can receive from the first sensor a first signal representative of the initiation of an offload event and in response record a beginning weight of the second storage carrier. The scale controller can receive from the first sensor a second signal representative of the end of an offload event and in response record an ending weight of the second storage carrier for determining the weight of the material deposited from the unloading apparatus of the first storage carrier into the second storage carrier. The scale controller can also initiate a tare command to begin weighing the material in response to receiving the first signal and end the tare command to end weighing the material in response to receiving the second signal.

This system is particularly useful when the first sensor is on the first storage carrier and the second sensor is on a second storage carrier. In this case the first storage carrier and the second storage carrier are separated from each other with no interconnecting parts. The first sensor can be combined to an exterior of the first storage carrier and detect vibrations of the unloading apparatus and associate the vibrations with the offloading of the material.

The first sensor can be any sensor for detecting vibrations, including an accelerometer, an inertial measurement unit, or both. The inertial measurement unit can detect accelerations in six distinct axes, which is particularly useful for detecting vibrations.

In another implementation, a method for measuring the weight of material is disclosed. The method comprises monitoring vibrations of an unloading apparatus for an unloading event, entering a tare mode on a scale controller connected to a load cell on a storage carrier upon detection of vibrations associated with the unloading event, weighing the material, continuing monitoring of the vibrations of the unloading apparatus, and ending a tare mode of the scale controller upon detection of the ending of the vibrations associated with the unloading event. The method continues with recording a tare weight record corresponding to a weight of the material and recording a geographical location of the storage carrier following the ending of the tare mode of the scale controller.

In one implementation, the method continues with confirming the ground speed of the storage carrier is below a predetermined threshold before entering the tare mode, exiting the tare mode and deleting the tare weight record if the vibrations associated with the unloading event do not continue for a predetermined amount of time, and exiting the tare mode and deleting the tare weight record if the weight of the material does not exceed a predetermined amount within a predetermined amount of time.

In another implementation, an apparatus is provided. The apparatus comprises of a portable housing combinable to an unloading apparatus of a first storage carrier. The portable housing can be combined in any manner, but a magnet on the underside of the portable housing allows for quick and easy placement and removal. A first sensor in the portable housing is provided for detecting vibrations of the unloading apparatus associated with offloading the material from the first storage carrier.

In one implementation, the first sensor is in communication with a scale controller for receiving from the first sensor a first signal representative of the initiation of an offload event and in response the scale controller records a beginning weight of the second storage carrier, and wherein the scale controller receives from the first sensor a second signal representative of the end of an offload event and in response records an ending weight of the second storage carrier for determining the weight of the material deposited from the unloading apparatus of the first storage carrier into the second storage carrier.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
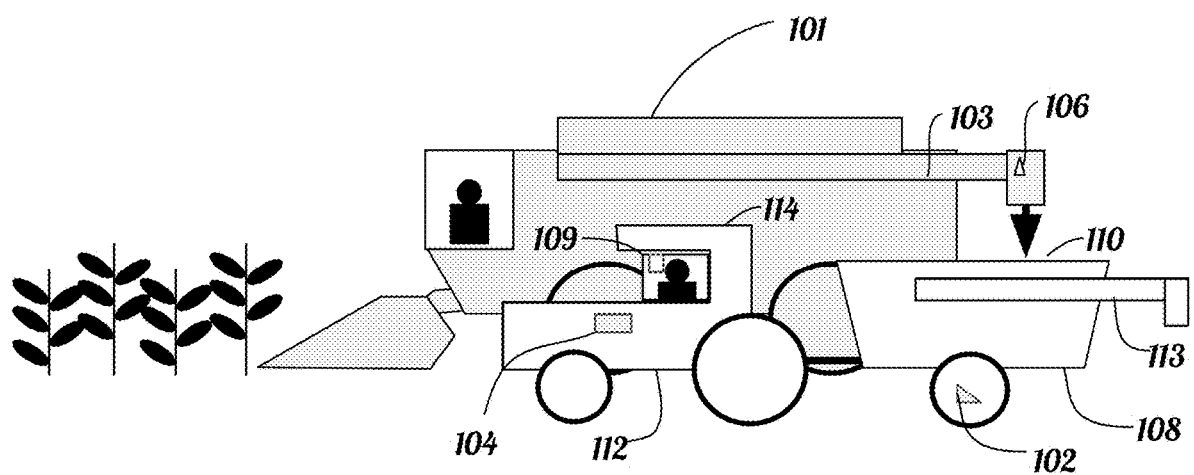
FIG. 1 is a drawing that shows a combine loading grain into a grain cart.

Referring to FIG. 1, shown is a combine 101 loading grain into a grain cart 108 with associated software and devices for measuring the weight of an agricultural commodity. The associated devices (shown in FIG. 3) comprise at least one load cell 102 with a scale controller 104 in communication with a first sensor 106 and in communication with a mobile device 109 to form a weighing system 100 that provides automatic start/stop control of the weighing function of load cell 102 based on characteristics associated with the beginning and ending of a loading/unloading process.

For purposes of this disclosure, a storage carrier is any device capable of holding a commodity, including a combine/harvester, a mobile hopper, a wagon, a grain cart, etc. When reference is made to a particular device being combined to a storage carrier, this means anywhere on the storage carrier unless a particular location is specifically referenced.

In general, combine 101 comprises of an unloading apparatus 103, such as an auger, which it can extend to a position relative to the middle of a storage area 110 of grain cart 108. Grain cart 108 comprises storage area 110 that is configured to store material in a hopper and discharge the material through an opening at the base of storage area 110. Storage area 110 includes load cell 102 that continuously monitors the weight of material present in storage area 110. Load cell 102 may be located in a number of locations, including but not limited to the hitch or wheel axle. The opening at the base of storage area 110 is separated from an unloading apparatus 113, such as an auger, conveyor, vacuum system, or other embodiment to transport or move the grain out of the storage area 110) by a hopper door. The hopper door may be mechanically, hydraulically, or electrically actuated. Unloading apparatus 113 can be an auger, as shown, or belt conveyor. Unloading apparatus 113 can be driven by a PTO shaft which is in turn driven by the engine or other power source of a tractor 112. The entire system can be controlled by an operator who sits in the cab 114 of tractor 112. Inside cab 114 of tractor 112 or mounted to grain cart 108 can be scale controller 104, which will be discussed in detail below.

Figure 2:
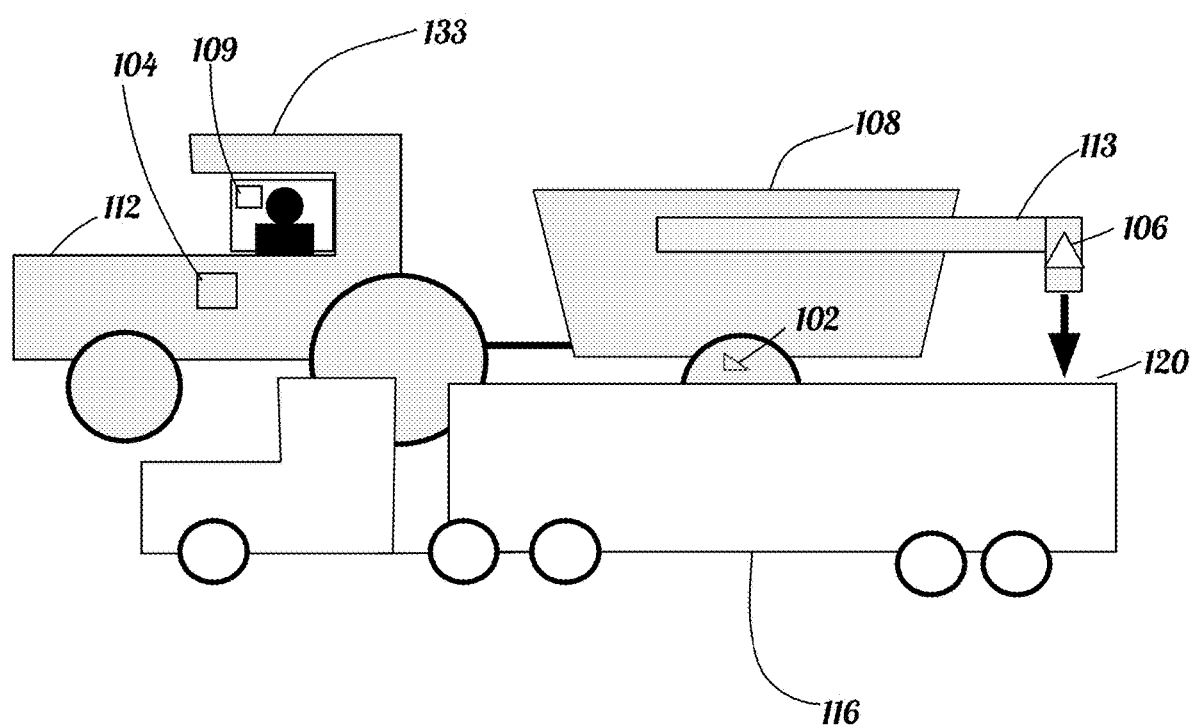
FIG. 2 is a drawing that shows a grain cart loading grain into a semi trailer.

Referring to FIG. 2, shown is grain cart 108 loading grain into a semi-trailer 116. Grain cart 108 is moved to a position with unloading apparatus 113 extended to a position above a storage container 120 of semi-trailer 116. Unloading apparatus 113 can be driven by a PTO shaft which is in turn driven by the engine or other power source of tractor 112.

Figure 3:
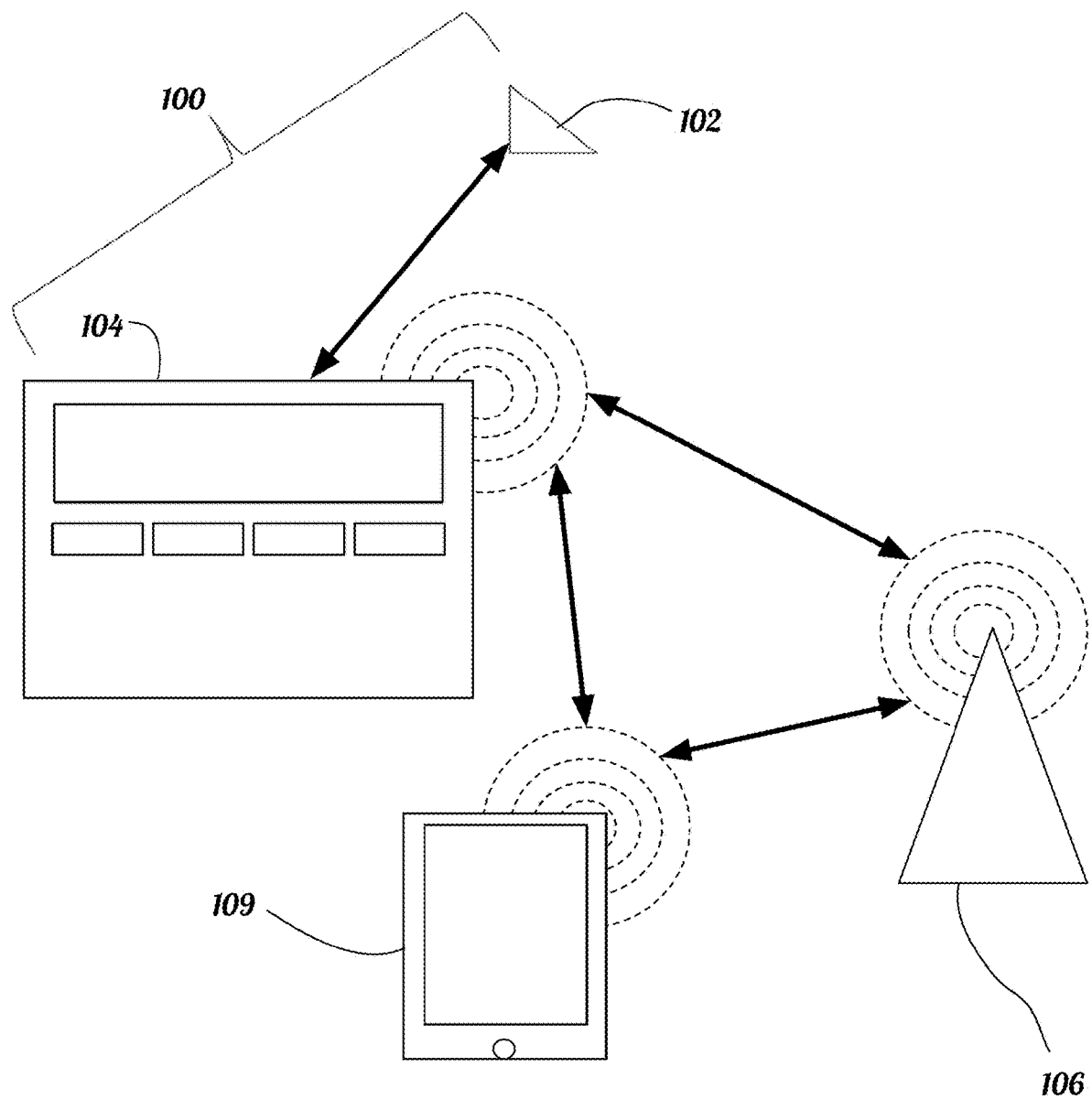
FIG. 3 is a drawing that shows a weighing system according to this disclosure.

Each of these loading/unloading arrangements comprises weighing system 100, as shown in FIG. 3. Weighing system 100 comprises of scale controller 104 in communication with first sensor 106 and in communication with mobile device 109. Scale controller 104 receives the weight signal from load cell 102 and translates the weight signal into measurements of the commodity. As previously stated load cell 102 can be positioned on the axle or the hitch and configured for wired or wireless communication with scale controller 104, which can be positioned in cab 114 of tractor 112 with the weight from load cell 102 shown on the display or can be hosted in the cloud or in another remote location and wirelessly connected to load cell 102. One skilled in the art will recognize that multiple load cells 102 can be provided and linked in communication with scale controller 104. Scale controller 104 further comprises of a tare mode. A tare mode records the starting weight value and ending weight value and computes the difference between the values to arrive at the total weight amount for a loading or unloading event.

First sensor 106 is in communication with scale controller 104 and provided to detect when to initiate and conclude the tear mode of scale controller 104. First sensor 106 can comprise vibration detector which can include an accelerometer, an inertial measurement unit ("IMU"), or both, any combination of which can be used for detecting vibrations. First sensor 106 is designed to detect vibrations or other characteristics associated with the beginning and ending of a loading/unloading process which is then associated with the tare mode of scale controller 104. In one implementation, first sensor 106 is an IMU which measures linear and rotational accelerations in six distinct axes, further defined as the linear axes of axis X, axis Y and axis Z and rotational axes of pitch(U), roll(V) and yaw(W). All vibrations within these axes can be evaluated through specific profiles and further signatures of distinct events occurring during normal, repeatable patterns.

Figure 4:
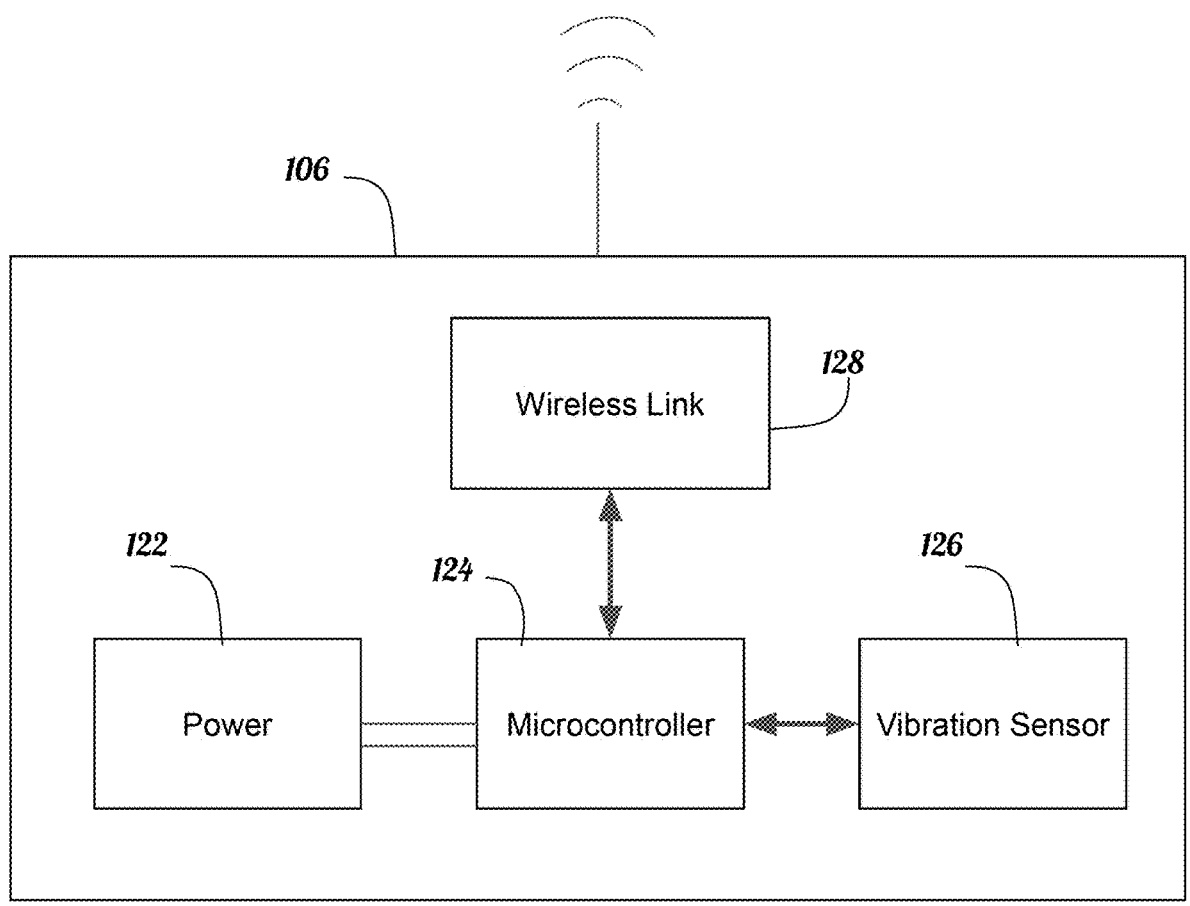
FIG. 4 shows a block diagram of first sensor.

Referring to FIG. 4, shown is a block diagram of first sensor 106. First sensor 106 comprises of a power source 122 for providing power to all the on-board circuitry including a microcontroller 124, a vibration sensor 126, and a wireless link 128 for establishing communication between first sensor 106 and scale controller 104 and mobile device 109. Microcontroller 124 can comprise software to recognize vibrations associated with the operation of unloading apparatus 103 moving commodity. Microcontroller 124 can also comprise machine learning analysis algorithm in a machine learning core 600, which is described in more detail below, to improve its ability to recognize vibrations associated with the operation of unloading apparatus 103.

Figure 5A:
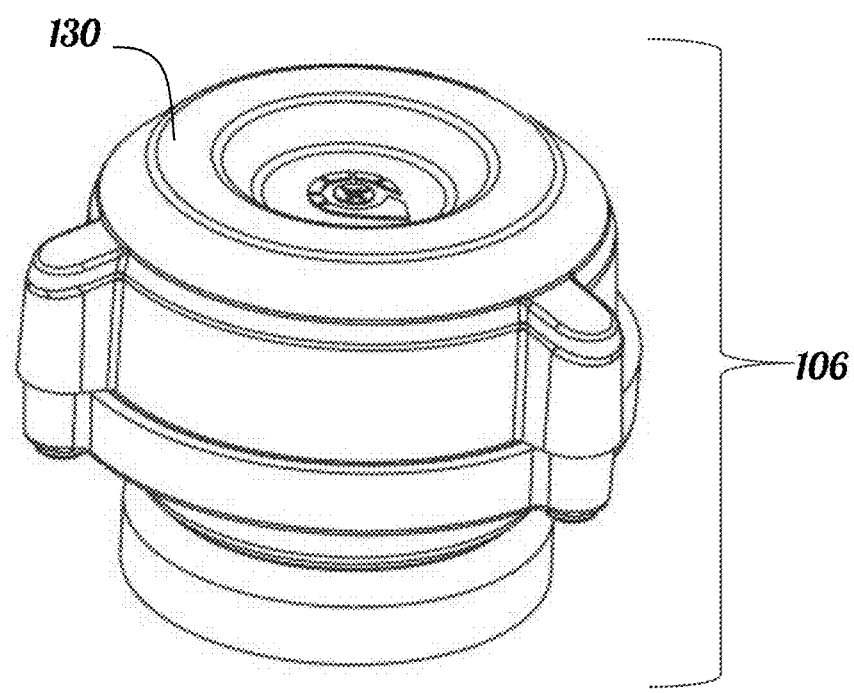
FIG. 5A shows a portable housing for housing first sensor of FIG. 4.
Figure 5B:
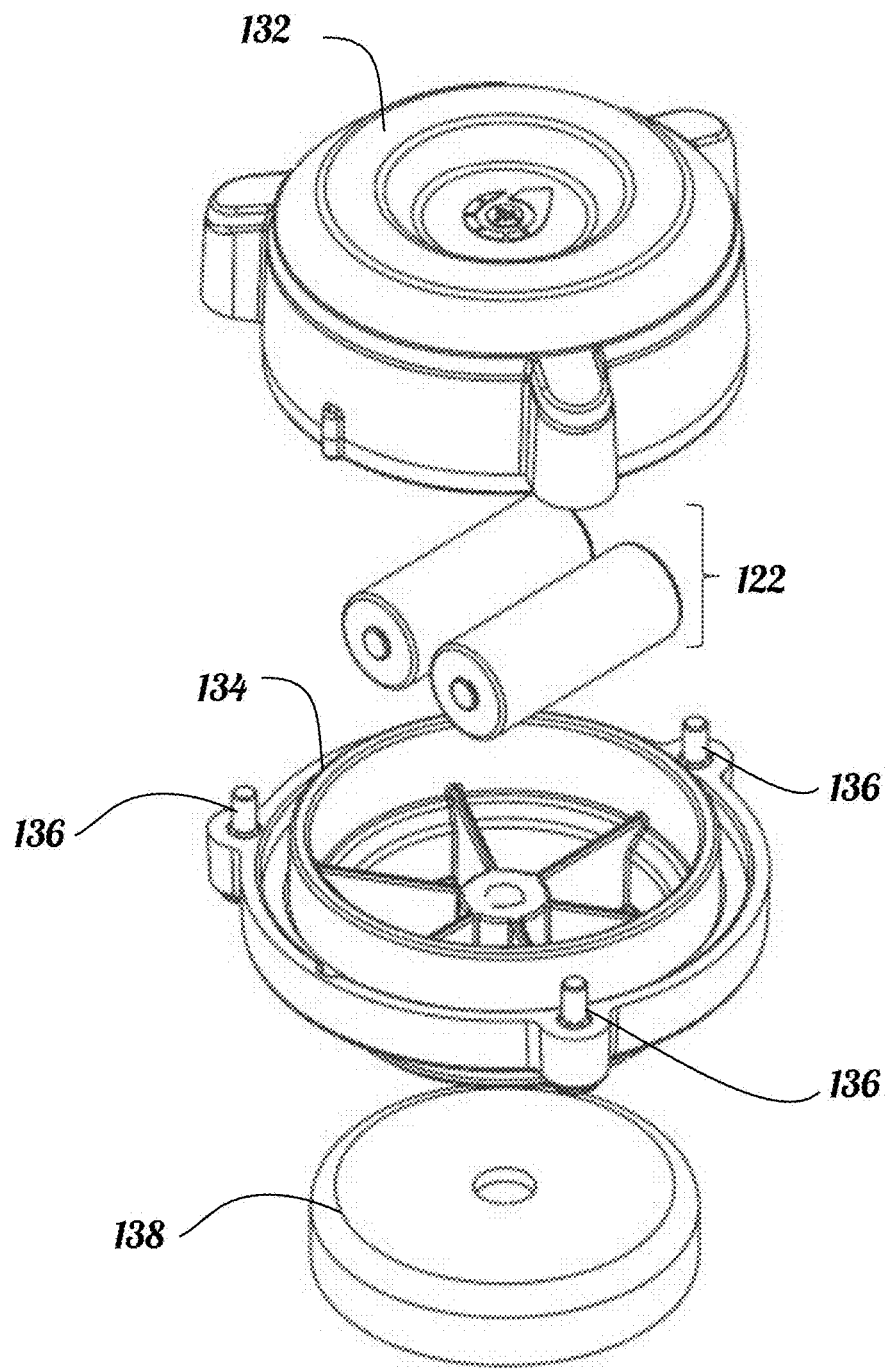
FIG. 5B shows an exploded view of the portable housing of FIG. 5A.

Referring to FIG. 5A and FIG. 5B, shown is a portable housing 130 for housing first sensor 106. Portable housing 130 can comprise of a top portion 132 and a bottom portion 134 held together by fasteners 136. The circuit elements shown in FIG. 4 can be safely stored inside portable housing 130, which when top portion 132 and bottom portion 134 are sealed together by fasteners 136, provides a water proof and rugged case for the sensitive electronic equipment. A magnet 138 can be fixed to the underside of bottom portion 134 so that first sensor 106 can be easily attached and removed or repositioned on the farm equipment. One skilled in the art will recognize that first sensor 106 can be attached in any manner, but a magnetic attachment has certain advantages.

Weight and other data from scale controller 104 can be sent to mobile device 109 for viewing, analysis, recording, and storage in a network-connected server or other storage environment. Mobile device 109 can run mobile application software and controllers to communicatively couple mobile device 109 with scale controller 104 and to first sensor 106.

Referring back to FIGS. 1 and 2, first sensor 106 is attached to unloading apparatus 103 and unloading apparatus 113, respectively, where vibrations can be detected. As previously stated, first sensor can be connected to any location where the unloading vibrations can be detected, such as the auger, the PTO, or the gear box. Scale controller 104 is communicatively coupled to load cell 102, to first sensor 106, and to mobile device 109. The communication coupling can be wired connections or wireless. The wireless communication protocol can be cellular, wifi, Bluetooth®, or combination thereof.

The operator of combine 101 or grain cart 108 (FIG. 1 and FIG. 2, respectively) turns on scale controller 104 which provides power to load cell 102. Referring to the example in FIG. 1, the operator positions grain cart 108 adjacent to combine 101. Scale controller 104 recognizes the identity of first sensor 106 and associates first sensor 106 to scale controller 104. First sensor 106 provides feedback and monitoring of the vibrations profile coming from unloading apparatus 103 of combine 101, which can be monitored by scale controller 104. Once the vibrations detected by first sensor 106 meets specific criteria associated with an operating condition for unloading apparatus 103, scale controller 104 initiates the a tare mode of scale controller 104. Once the tare is initiated, scale controller 104 continues to monitor the vibration of unloading apparatus 103 and when the vibrations change so that they no longer correspond with the operating profile, scale controller 104 ends the tare mode. Scale controller records the tare weight record of the loading event and can also contain a GPS module or a combination of hardware and software to determine and record the geographical position of the tare weight record.

Referring to the example in FIG. 2, a similar operation occurs when unloading grain cart 108 to a semi-trailer 116. In this implementation, however, first sensor 106 is positioned on unloading apparatus 113 of grain cart 108, which is doing the unloading. Once the unloading operation begins and first sensor 106 detects equivalent vibrations, the tare operation in scale controller 104 is initiated and load cell 102 effectively measures the amount weight removed from grain cart 108.

Figure 6:
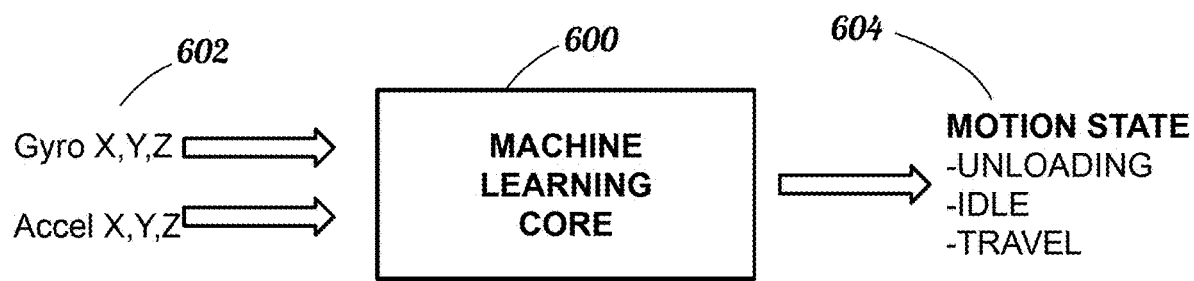
FIG. 6 shows a machine learning core that can be implemented in the microcontroller of the first sensor to improve the detection of an unloading event.
Figure 7:
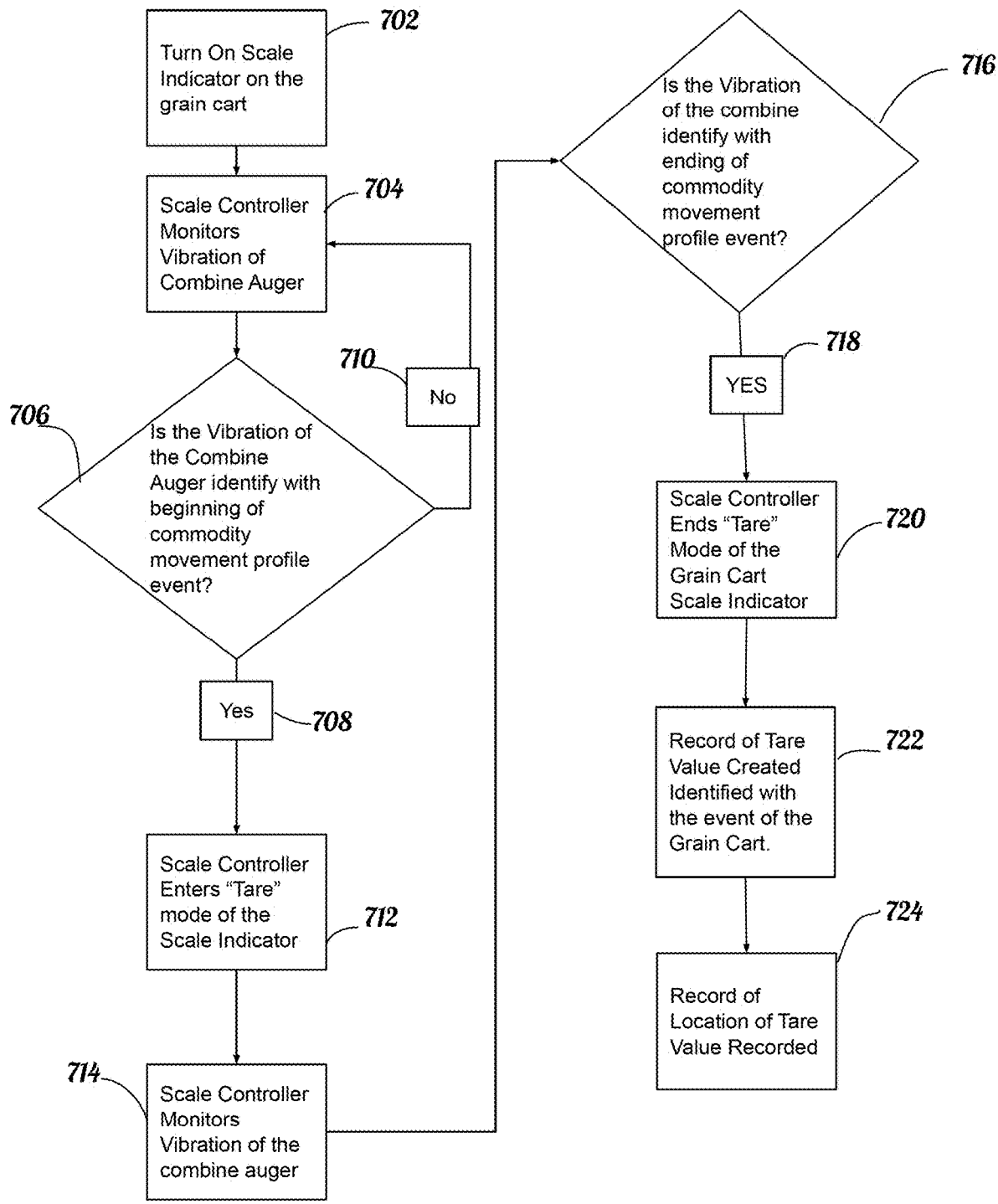
FIG. 7 shows a flow chart for a method for weighing commodity unloaded from a combine to a grain cart.

Referring to FIG. 6, a machine learning core 600 may also be used to determine from at least one characteristic of the vibratory signal a motion state. FIG. 6 shows machine learning core 600 implemented with a machine learning analysis algorithm comprising of instructions that are executable on microcontroller 124 of first sensor 106 or in the processor of scale controller 104. The software and methods are described below as being used by first sensor 106.

Accordingly, vibratory signals 602 are continuously detected and provided to microcontroller 124, which houses a programming file of various filtering of the axes output signal provided by vibration sensor 126. Vibratory signals 602 can represent a gyroscopic axis and an accelerometer axis, as previously described, or any other vibratory signal, which are provided to machine learning core 600 running on microcontroller 124. The machine learning core program file housed within microcontroller 124 provides a decision gate of vibratory motion state 604 as an output via advanced programming and filtering to support algorithmic results for the motion state. Further, the capability of updating the machine learning core program file housed within machine learning core 600 of microcontroller 124 provides an avenue of an artificial intelligence engine to update the filtering aspect of the machine learning core application with analysis of a vibration data library separate from the vibration sensor 106, without updating other elements of the microcontroller operating system embedded on the microcontroller.

The foregoing can be implemented in one or more methods, as shown in FIGS. 7-11. Beginning with FIG. 7, a method for weighing commodity unloaded from combine 101 to grain cart 108 is shown. The method begins at step 702 with turning on scale controller 104, which synchronizes communication with load cell 102 on grain cart 108, first sensor 106 on unloading apparatus 103 of combine 101, and mobile device 109. Scale controller 104 is able to recognize the identity of first sensor 106 and associate therewith. In this regard, multiple first sensors 106 can be used by the operator on a corresponding number of multiple machines with scale controller 104 being able to recognize and identify each. At step 704 the method continues with scale controller 104 receiving signals from first sensor 106 and monitoring for vibrations indicative of unloading apparatus 103 being turned on. Scale controller 104 recognizes when vibrations associated with the operation of unloading apparatus 103 moving commodity. At step 706, scale controller 104 includes a decision gate of yes 708 or no 710 commands where when the criteria is met a tare mode of scale controller 104 is initiated at step 712.

Once the tare is initiated, scale controller 104 continues to monitor the vibration] of unloading apparatus 103 at step 714 and when the method identifies when unloading apparatus 103 has been turned off or commodity is no longer being moved through unloading apparatus 103 a decision is made at step 716 with a yes command at step 718 for scale controller 104 to end the tare mode at step 720. At step 722, scale controller 104 records the tare weight record of the loading event and can record the geographical position of the tare weight record at step 724. These recorded values can be communicated to mobile device 109 for storage.

Figure 8:
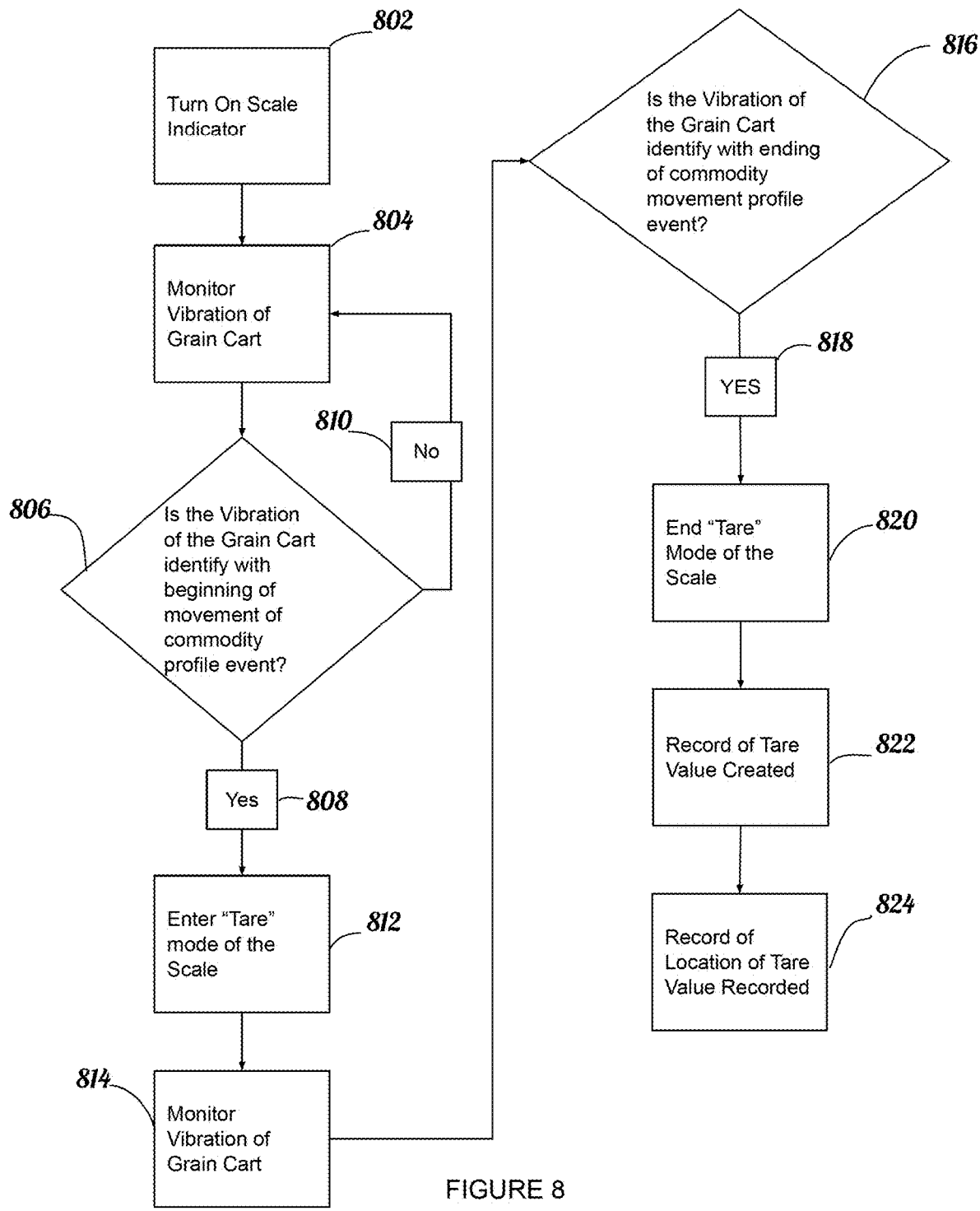
FIG. 8 shows a flow chart for a method for weighing commodity unloaded from a grain cart to a semi-trailer.

Turning to FIG. 8, shown is a method for weighing commodity unloaded from grain cart 108 to a semi-trailer 116. The method begins at step 802 with turning on scale controller 104, which synchronizes communication with load cell 102 on grain cart 108, first sensor 106 on unloading apparatus 113 of grain cart 108, and mobile device 109. Scale controller 104 is able to recognize the identity of first sensor 106 and associate therewith. In this regard, multiple first sensors 106 can be used by the operator on a corresponding number of multiple machines with scale controller 104 being able to recognize and identify each. At step 804 the method continues with scale controller 104 receiving signals from first sensor 106 and monitoring for vibrations indicative of unloading apparatus 113 being turned on. Scale controller 104 recognizes when vibrations associated with the operation of unloading apparatus 113 moving commodity. At step 806, scale controller 104 includes a decision gate of yes 808 or no 810 commands where when the criteria is met a tare mode of scale controller 104 is initiated at step 812.

Once the tare is initiated, scale controller 104 continues to monitor the vibration of unloading apparatus 113 at step 814 and when the method identifies when unloading apparatus 113 has been turned off or commodity is no longer being moved through unloading apparatus 113 a decision is made at step 816 with a yes command at step 818 for scale controller 104 to end the tare mode at step 820. At step 822, scale controller 104 records the tare weight record of the loading event and can record the geographical position of the tare weight record at step 824. These recorded values can be communicated to mobile device 109 for storage.

Figure 9:
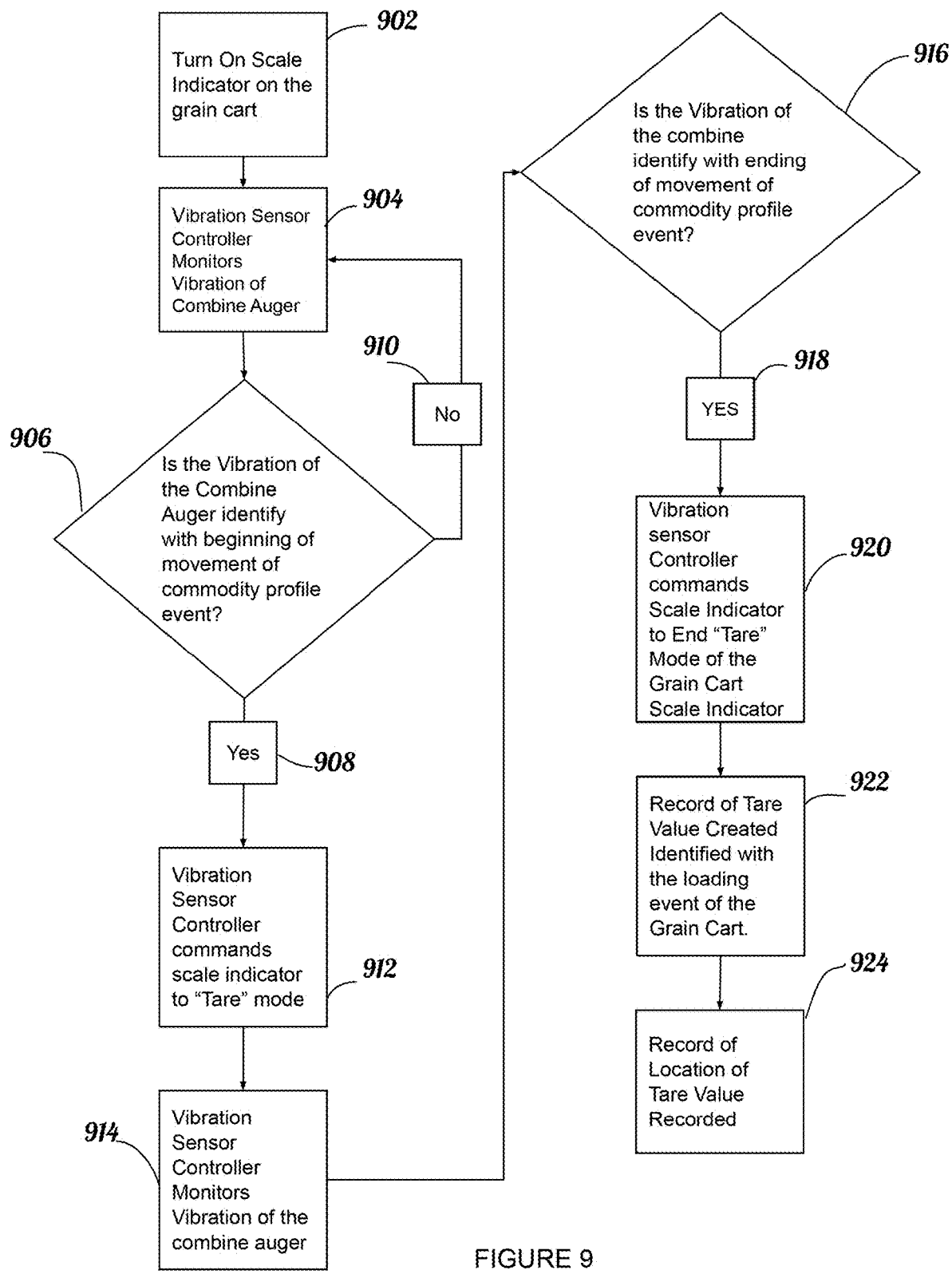
FIG. 9 shows a flow chart for a method for weighing commodity unloaded from a combine to a grain cart where the first sensor detects and commands the scale controller to begin the tare mode of operation.

Referring to FIG. 9, shown is a method for weighing commodity unloaded from combine 101 to grain cart 108 where first sensor 106 detects and commands scale controller 104 to begin the tare mode of operation. The method begins at step 902 with turning on scale controller 104, which synchronizes communication with load cell 102 on grain cart 108, first sensor 106 on unloading apparatus 103 of combine 101, and mobile device 109. Scale controller 104 is able to recognize the identity of first sensor 106 and associate therewith. In this regard, multiple first sensors 106 can be used by the operator on a corresponding number of multiple machines with scale controller 104 being able to recognize and identify each. At step 904 the method continues with first sensor 106 monitoring for vibrations indicative of unloading apparatus 103 being turned on. First sensor 106 recognizes vibrations associated with the operation of unloading apparatus 103 moving commodity. At step 906, first sensor 106 includes a decision gate of yes 908 or no 910 commands where when the criteria is met a command signal to begin tare mode is sent to scale controller 104 and is initiated at step 912.

Once the tare is initiated, first sensor 106 continues to monitor the vibration of unloading apparatus 103 at step 914 and when the method identifies when unloading apparatus 103 has been turned off or commodity is no longer being moved through unloading apparatus 103 a decision is made at step 916 with a yes command at step 918 with a command signal from first sensor 106 for scale controller 104 to end the tare mode at step 920. At step 922, scale controller 104 records the tare weight record of the loading event and can record the geographical position of the tare weight record at step 924. These recorded values can be communicated to mobile device 109 for storage.

Figure 10:
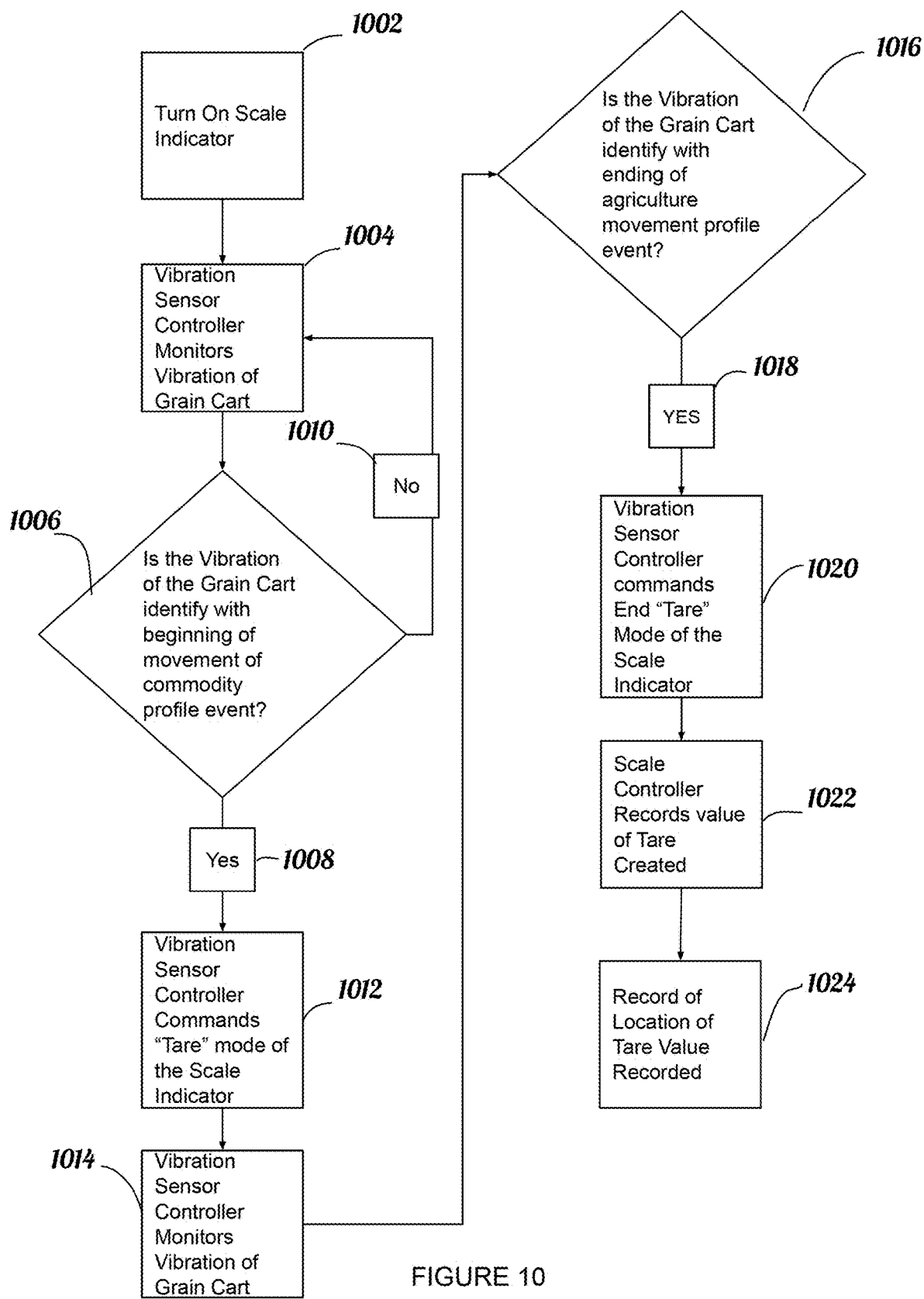
FIG. 10 shows a flow chart for a method for weighing commodity unloaded from a grain cart to a semi-trailer where the first sensor detects and commands the scale controller to begin the tare mode of operation.

Turning to FIG. 10, shown is a method for weighing commodity unloaded from grain cart 108 to a semi-trailer 116 where first sensor 106 detects and commands scale controller 104 to begin the tare mode of operation. The method begins at step 1002 with turning on scale controller 104, which synchronizes communication with load cell 102 on grain cart 108, first sensor 106 on unloading apparatus 113 of grain cart 108, and mobile device 109. Scale controller 104 is able to recognize the identity of first sensor 106 and associate therewith. In this regard, multiple first sensors 106 can be used by the operator on a corresponding number of multiple machines with scale controller 104 being able to recognize and identify each. At step 1004 the method continues with first sensor 106 monitoring for vibrations indicative of unloading apparatus 113 being turned on. First sensor 106 recognizes when vibrations associated with the operation of unloading apparatus 113 moving commodity. At step 1006, first sensor 106 includes a decision gate of yes 1008 or no 1010 commands where when the criteria is met a tare mode of scale controller 104 is initiated at step 1012 by a command signal from first sensor 106.

Once the tare is initiated, first sensor 106 continues to monitor the vibration of unloading apparatus 113 at step 1014 and when the method identifies when unloading apparatus 113 has been turned off or commodity is no longer being moved through unloading apparatus 113 a decision is made at step 1016 with a yes command at step 1018 for first sensor 106 to send a command signal to scale controller 104 to end the tare mode at step 1020. At step 1022, scale controller 104 records the tare weight record of the loading event and can record the geographical position of the tare weight record at step 1024. These recorded values can be communicated to mobile device 109 for storage.

In an alternative implementation, the methods and systems herein described can be improved to limit false positives. A ground speed sensor for measuring the speed of the unloading vehicle can be provided to reduce or eliminate any false positives. First sensor 106 detects vibrations associated with commodity being unloaded, but the speed of the unloading vehicle is above a threshold value then it is likely a false positive. The threshold value can be three miles per hour, but one skilled in the art would recognizes that any value above or below 3 mph could be used as the threshold. The speed sensor can be included in mobile device 109 or in scale controller 104 where ground speed is measured by software and the GPS module or by a separate speed measuring device.

Figure 11:
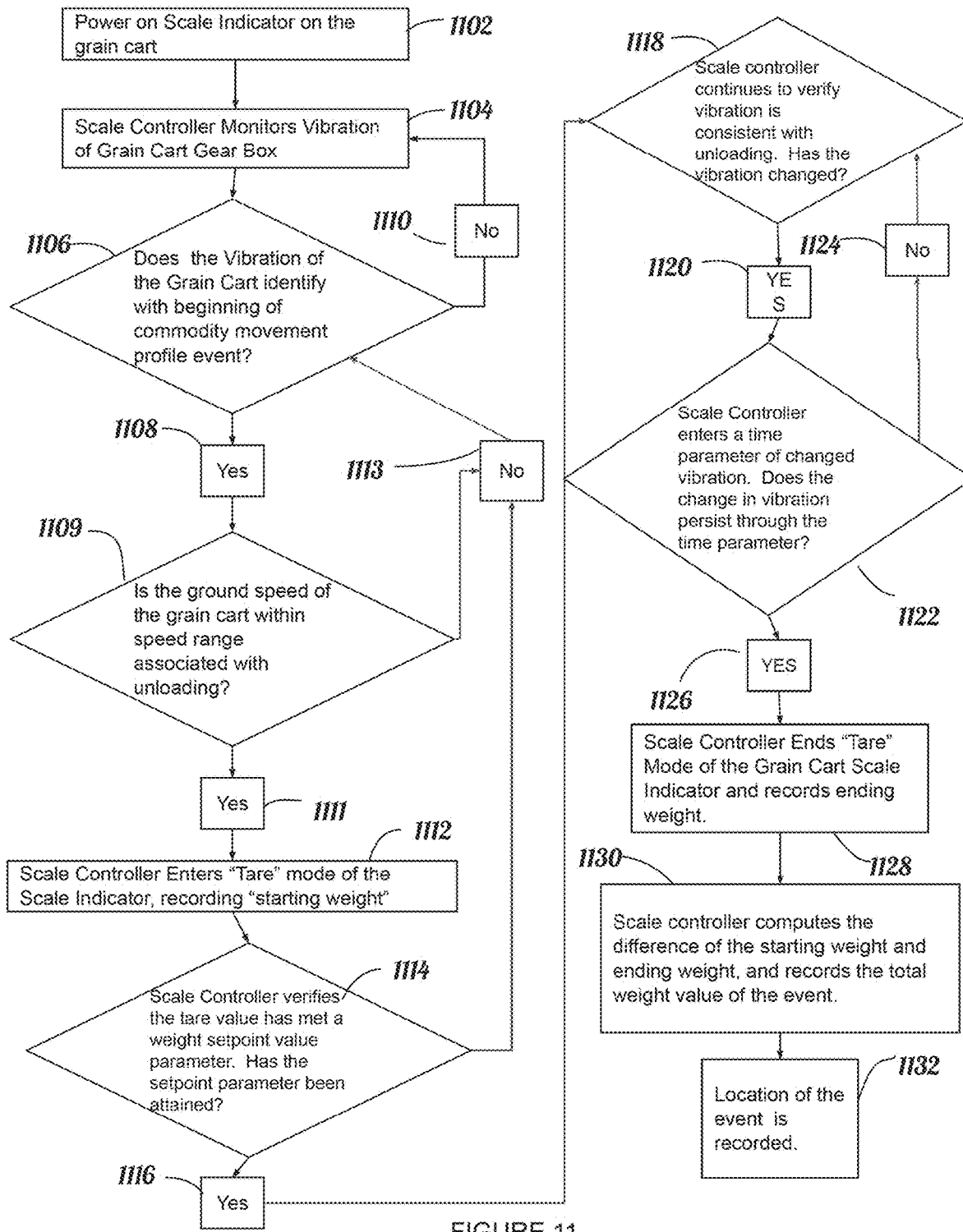
FIG. 11 shows a flow chart of a method implementing the false positive detection method and associated with grain cart.

Referring to FIG. 11, shown is a method implementing the false positive detection method and associated with grain cart 108. One skilled in the art will recognize that any of the other methods described above can be modified accordingly.

The method begins at step 1102 with turning on scale controller 104, which synchronizes communication with load cell 102 on grain cart 108, first sensor 106 on unloading apparatus 113 of grain cart 108, and mobile device 109. Scale controller 104 is able to recognize the identity of first sensor 106 and associate therewith. In this regard, multiple first sensors 106 can be used by the operator on a corresponding number of multiple machines with scale controller 104 being able to recognize and identify each. At step 1104 the method continues with scale controller 104 receiving signals from first sensor 106 and monitoring for vibrations indicative of unloading apparatus 113 being turned on. Scale controller 104 recognizes when vibrations associated with the operation of unloading apparatus 113 moving commodity. At step 1106, scale controller 104 includes a decision gate of yes 1108 or no 1110 commands where when the criteria is met another decision gate 1109 of yes 1111 or no 1113 associated with whether the ground speed of grain cart 108 is below the threshold value for unloading commodity. If yes 1111, the a tare mode of scale controller 104 is initiated at step 1112.

Another false positive check can be provided at step 1114 where scale controller 104 checks whether the tare weight record has met a small weight setpoint value parameter in computed difference with the initial starting weight. If the weight setpoint value parameter was not reached from the initial starting weight, the logic returns to monitoring vibration decision gate from first sensor 106. If the decision gate for the weight parameter was achieved, first sensor 106 continues to monitor vibrations indicative of an unloading event.

More specifically, this weight setpoint value provides consideration of abnormal vibration experienced within an "empty" container that may trigger the recording of the load. The vibrations can come from the resonance from a charged hydraulic system or the powertrain from the tractor. These types of vibrations may be magnified further by an empty container. This weight setpoint parameter allows scale controller 104 to "throw away the record" and return to monitoring first sensor 106 to initiate another decision gate for a new tare value.

As an example, the method can sense a vibration is consistent with an unloading event. An initial beginning tare weight record can be recorded in memory. A timer (such as a 5 second timer) can be started. A setpoint value of, for example, 300 pounds could be set. If the weight does not exceed 300 pounds in 5 second, the record can be thrown out and the initial tare weight record can once again be derived by vibration profile recognition.

Yet another false positive check can be provided at step 1122 where a time parameter associated with the sustained response of the end of motion of the agriculture commodity from first sensor 106. This timing parameter at the "End" of the tare sequence allows for forgiveness while unloading and moving grain cart 108 at the same time. While loading a long trailer of a truck, grain cart 108 can be "jerked" and moved rapidly. The method can detect simultaneous unload vibration and travel over terrain, however, if the grain cart is operated poorly (the operator pops the clutch and lurches forward, then slams on their breaks) first sensor 106 may momentarily detect a state of travel which would end the unload sequence. The time parameter corrects this. If the status of first sensor 106 recovers back to an unloading vibration indication, the timer can be extinguished and the tare can continue. Should the timer meet its setpoint, the tare weight record is recorded and the load record is captured. This prevents multiple load records being generated on a single truck unload operation, in consideration of a poorly operated grain cart (e.g., operator error).

Should the time parameter be met, the decision is made by scale controller 104 to end the tare mode and record an ending weight, thus ending the tare from the lack of vibration synonymous with grain cart being finished with the unloading process. Should the time parameter not be met and response from first sensor 106 changes to recognizing vibration synonymous with an unloading event, the beginning tare weight record can be sustained and first sensor 106 will continue to be monitored for the end of the unloading event. This is recognized as a momentary change in vibration may occur during unloading and momentary travel, forward or rear, of the grain cart. After the scale controller ends the tare mode, scale controller 104 can compute the difference of the starting weight and ending weight and records the weight amount unloaded. Further, a location of the unloaded value can be recorded at step 1132 by scale controller 104.

Once the tare is initiated, scale controller 104 continues to monitor the vibration of unloading apparatus 113 and when the method identifies when unloading apparatus 113 has been turned off or commodity is no longer being moved through unloading apparatus 113 a decision is made at step 1128 for scale controller 104 to end the tare mode. At step 1130, scale controller 104 calculates the difference between the starting weight and the ending weight and records the tare weight record of the loading event and can record the geographical position of the tare weight record at step 1130. These recorded values can be communicated to mobile device 109 for storage.

One or more components of the systems and methods for measuring the weight of commodity can comprise any collection of processor-based devices or computing devices operating together, or components of processing systems or devices, as is known in the art. The processing system in scale controller 104 or first sensor 106 can include, for example, one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system. In this regard, it should be noted that scale controller 104 can be replaced with mobile device 109. The weight information can be transmitted to mobile device 109 and processed by an associated mobile application where the data is stored in a remote server.

The processing system of an embodiment includes at least one processor and at least one memory device or subsystem in scale controller 104 or first sensor 106. The processing system can also include or be coupled to at least one database. The term "processor" as generally used herein refers to any logic processing unit, such as one or more central processing units (CPUs), digital signal processors (DSPs), application-specific integrated circuits (ASIC), micro-processor, etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods of weighing commodity can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages. These communication paths can connect, for example, scale controller 104 and first sensor 106 and mobile device 109.

Aspects of the systems and methods of weighing commodity and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods: microcontrollers with memory (such as electronically erasable programmable read only memory (EEPROM)), embedded microprocessors, firmware, software, etc. Furthermore, aspects of the systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A method for measuring the weight of material, the method comprising:
    monitoring vibrations of an unloading apparatus for an unloading event;
    entering a tare mode on a scale controller connected to a load cell on a storage carrier upon detection of vibrations associated with the unloading event;
    weighing the material;
    continuing monitoring of the vibrations of the unloading apparatus; and
    ending a tare mode of the scale controller upon detection of the ending of the vibrations associated with the unloading event.

2. The method of claim 1, and further comprising recording a tare weight record corresponding to a weight of the material.

3. The method of claim 1, and further comprising recording a geographical location of the storage carrier following the ending of the tare mode of the scale controller.

4. The method of claim 2, and further comprising confirming the ground speed of the storage carrier is below a predetermined threshold before entering the tare mode.

5. The method of claim 2, and further comprising exiting the tare mode and deleting the tare weight record if the vibrations associated with the unloading event do not continue for a predetermined amount of time.

6. The method of claim 2, and further comprising exiting the tare mode and deleting the tare weight record if the weight of the material does not exceed a predetermined amount within a predetermined amount of time.

* * * * *